United States Patent [19]

Johnson

[11] 4,280,939

[45] Jul. 28, 1981

[54] THERMOPLASTIC INK COMPOSITION FOR DECORATING GLASS, GLASS-CERAMIC, AND CERAMIC WARE

[75] Inventor: Ronald E. Johnson, Tioga, Pa.

[73] Assignee: Corning Glass Works, Corning, N.Y.

[21] Appl. No.: 74,907

[22] Filed: Sep. 13, 1979

[51] Int. Cl.$^3$ ............................................. C08L 91/00
[52] U.S. Cl. ............................... 260/23 AR; 106/22;
 106/23; 106/31; 260/27 R; 260/28.5 AV;
 260/31.8 R; 260/31.8 G; 260/31.8 XA;
 260/31.8 M; 260/33.6 UA
[58] Field of Search ................ 260/28.5 AV, 23 AR,
 260/27 R, 33.6 UA, 31.8 M, 31.8 XA, 31.8 G,
 31.8 R, 27 EV; 106/31, 22, 23

[56] References Cited

U.S. PATENT DOCUMENTS

| | | | |
|---|---|---|---|
| 3,896,069 | 7/1975 | Kosaka et al. | 260/28.5 AV |
| 3,914,489 | 10/1975 | Smedberg | 260/28.5 AV |
| 3,979,305 | 9/1976 | Fischer et al. | 260/28.5 AV |
| 4,146,521 | 3/1979 | Godfrey | 260/28.5 AV |

*Primary Examiner*—Melvyn I. Marquis
*Attorney, Agent, or Firm*—Clinton S. Janes, Jr.

[57] ABSTRACT

The subject invention is directed toward the production of thermoplastic inks exhibiting pressure sensitivity at temperatures substantially below the softening points thereof consisting essentially, in weight percent, of:

(a) about 50–80% of a pigmented, vitreous, inorganic flux;
(b) about 2–20% of an ethylene-ester copolymer resin;
(c) about 4–20% of an amorphous tackifying resin;
(d) about 5–25% of an organic wax and/or plasticizer; and
(e) 0–10% of a modifying polyolefin resin.

12 Claims, No Drawings

THERMOPLASTIC INK COMPOSITION FOR DECORATING GLASS, GLASS-CERAMIC, AND CERAMIC WARE

BACKGROUND OF THE INVENTION

The use of thermoplastic (hot melt) media in processes for decorating vitreous, glass-ceramic, and ceramic ware is well established. The principal technique utilized for the application of thermoplastic inks to such substrates has been screening, although other techniques, including transfer printing from an elastomeric surface, such as is disclosed in U.S. Pat. No. 3,688,695, have been described. The major advantage exhibited by thermoplastic inks is their capability to harden quickly upon contact with the surface of ware at room temperature so that, consequently, a second print can be applied over and/or adjacent to a first print without any intermediate drying step, such as is demanded for oil, organic solvent, or water base inks. The compositions comprising these thermoplastic inks have varied widely, but most have displayed wax-like characteristics with low melt viscosities, commonly less than 150 poises at their application temperature, and non-tacky surfaces when cooled substantially below the melting points thereof. The printing pastes or inks commonly consist of a vitrifiable, inorganic material or flux containing a suitable inorganic pigment or coloring material and an organic, flowable vehicle or binder in which the pigment is dispersed. Such pigmented flux materials are well known to the art of decorating glass, glass-ceramic, and ceramic ware, and are supplied by ceramic color manufacturers as complete vitrifiable or ceramic colors which are then dispersed in the vehicle or medium by the user in accordance with his requirements.

When employed in the decorating of glass, glass-ceramic, or ceramic surfaces, the inks are customarily filled with from about 60–90% by weight total of glass fluxes, inorganic pigments, and inorganic opacifiers. The inks so compounded and applied are subsequently fired at high temperatures (over ~500° C.) to burn out the organic constituents and melt the glass to form indelible markings on the surface of the ware. Consequently, it is obviously essential that the organic components utilized in the ink formulations have the necessary firing characteristics to permit them to be burned off at relatively low temperatures, thereby enabling their removal without deleterious effects upon the visual appearance and intrinsic properties of the fired inorganic decoration. Materials which have commonly been used therefor have included waxes such as fatty alcohols, polyethylene glycol, polyethylene glycol esters, etc., fortified with a cohesive strength imparting resin or viscosity modifier such as ethyl cellulose, hydroxypropyl cellulose, butyl methacrylate, etc.

Inks so formulated are satisfactory for screening processes but are not adequate for numerous other processes, especially those techniques employing transfer (offset) elastomers, such as offset screening or offset stamping from an intaglio plate. A representative process is discussed in U.S. Pat. No. 3,756,165. These offset printing processes were developed for use with conventional oil-based or solvent-based decorating inks. Such inks must dry from a liquid to a tacky, semi-solid state upon the elastomer surface after which they can be transferred as an integral film to a substrate. The thickening effect of the glass fluxes and pigments upon the viscosity of the ink requires the use of relatively high levels of organic solvents which, in turn, must demonstrate relatively high rates of volatilization so as not to limit process speeds and/or saturate the surface of the elastomer. However, the use of solvents having high rates of evaporation causes a viscosity stability problem which is of such magnitude that relatively slow process speeds are frequently resorted to as the lesser evil. This circumstance is exemplified in U.S. Pat. No. 3,756,165.

The advantages inherent in the use of thermoplastic inks for overcoming the viscosity problem are quite obvious, but the thermoplastic formulations typically utilized for screening were unsatisfactory for transfer (offset) printing because of their essential lack of pressure sensitivity at temperatures substantially below their melt points. This situation required the inks to either be heated to temperatures closely approaching their melt points during transfer or be transferred to an adhesive-coated ware surface. This circumstance is described in U.S. Pat. No. 3,688,695.

The art of decorating vitreous, glass-ceramic, and ceramic articles utilizing decalcomania transfers (decals) is also not of recent origin. Thus, decals produced from vitrifiable or ceramic colors have been used for a number of years to decorate glassware, chinaware, pottery, and the like.

The most common type of decalcomania has comprised a paper carrier or backing having the desired design imprinted thereupon in one or more vitrifiable colors. Water release decals have been extensively employed which are either of the slide-off type or the varnish-applied, duplex paper type. The slide-off decal utilizes a backing paper having a thin layer of a water soluble gum with the vitreous design imprinted face up upon this gummed surface. A clear supporting film, commonly of nitrocellulose, is applied over the design layer. The duplex paper type consists of a layer of thin tissue paper releasably mounted on a heavier paper sheet. The tissue paper carries a water soluble gum coating and the vitreous design layer is imprinted face down upon the gum coating. As the name suggests, it is necessary to soak these decalcomania with water to effect separation of the backing from the design. After the design has been temporarily attached to the ceramic substrate, the article is dried thoroughly, following which the article is fired at an elevated temperature to fuse the design into the surface thereof.

A comparatively recent development in the field of decalcomania has been the use of a heat release-type, vitreous or ceramic decal. These products consist of a heat releasable backing at the face or front side of the vitreous design layer and an outermost thermoplastic or heat activatable adhesive surface at the opposite or rear side of the vitreous design. When the outermost thermoplastic or heat activatable surface of the decal is pressed against the surface of a preheated vitreous or ceramic article, the heat of the article softens the adhesive surfaces of the decal to a sufficient extent such that the design is temporarily adhered to the article being decorated. Concurrently, the heat from the article softens or melts the heat release layer of the backing, thereby causing the backing to release from the design layer. Both actions are accomplished in essentially a single operation in which the decal is urged against the preheated article. Frequently, the released backing sheet will then be fully removed from the article utilizing a jet of air or the like. The ware with the temporarily adhered vitreous design is thereafter fired in the normal manner to cause the design to become an integral part of the surface of the ware.

Various modifications and improvements have been made to the basic structure or makeup of heat release decals. For example, the design layer may be either a single layer or, more frequently, a composite layer comprising several different ceramic color compositions arranged to provide the desired ornamentation or textual matter. Where desired to impart strength and integrity to the design layer or to supply an outermost surface that can be more readily rendered tacky or adhesive, another layer may be deposited over the vitreous design. This additional layer may be of a resinous material exhibiting thermoplastic properties or some special heat-activatable, thermoplastic adhesive material.

The term "thermoplastic" as employed in the context of this adhesive layer is to be distinguished from the term as applied above in connection with thermoplastic inks. In both instances, the materials reversibly soften with heat. Hence, the term "thermoplastic." However, when used in the context of inks, the term also implies melt processibility or application; whereas the material utilized for the decal adhesive layer is merely applied from solution over the vitreous design. Accordingly, to avoid ambiguity in the term "thermoplastic," melt processible inks are sometimes referred to as "hot melt inks" or simply "hot color;" whereas the solution-applied adhesive overlay is frequently referred to as a "lacquer."

The releasable backing of the conventional, heat release vitreous decalcomania generally comprises a paper sheet having a barrier layer or coating which renders one side of the paper less porous and retards penetration by molten wax or wax-like materials. Superjacent to the barrier layer is a coating or film of a wax-like, heat release material. Next above the heat release material is a clear film which serves as an imprint-receiving support for the subsequently applied vitreous design. Finally, if desired, the above-described strengthening and/or adhesive layer can be applied over the design.

A third type of vitreous or ceramic decalcomania is known in which the design layer releases from the paper backing solely upon the application of pressure. These decals have been defined in such terms as pressure release, cold release, and dry release. This type of decal shall be referred to herein as pressure release decals.

The structure of these decals can be similar to a heat release decal but wherein the wax release layer is replaced with a silicone release layer. Furthermore, the adhesive layer overlay must also demonstrate room temperature pressure sensitivity thereby obviating the need for heating to cause adherence of the decal to the surface of the ware. Because of the preferential adherence of the adhesive layer to a vitreous or ceramic surface rather than the silicone release layer, release of the decal is secured by merely pressing the decal against the ware to be decorated.

OBJECTIVES OF THE INVENTION

The primary objective of the instant invention is to provide thermoplastic inks, suitable for decorating vitreous, glass-ceramic, and ceramic articles, which display permanent pressure sensitivity at temperatures substantially below their softening (melt) points, thereby permitting them to be transferred from elastomeric or silicone-coated surfaces either immediately, or at a later time as would be required for a pressure release decalcomania.

Another objective of this invention is to provide thermoplastic inks, suitable for decorating vitreous, glass-ceramic, and ceramic articles, which have the capability of transferring between elastomeric or silicone-coated surfaces for which they have different degrees of affinity, thereby recommending their utility as decorating media for preparing pressure release decals via offset or flexographic processes, or in direct printing with processes that contemplate the use of a collector elastomer for multicolor prints, such as is described in U.S. Pat. No. 3,255,695.

Yet another objective of this invention is to provide thermoplastic inks, suitable for decorating vitreous, glass-ceramic, and ceramic articles, which do not exhibit pressure sensitivity below a certain temperature although maintaining pressure sensitivity sufficiently below their softening (melt) points to permit their utility for preparing heat release decalcomania via offset or flexographic processes.

SUMMARY OF THE INVENTION

Those and other objectives can be accomplished in thermoplastic inks having particularly-defined formulations. The inks exhibit permanent pressure sensitivity far below their melt points, some compositions to temperatures as low as 40° F. ($\sim 4$° C.). This pressure sensitivity enables the inks to be readily transferred between surfaces for which they have differing degrees of affinity, and renders such transfers relatively unaffected by a time delay between pickup and release of the ink from the transferring surface. The inventive formulations offer other advantages over presently-available, thermoplastic media for decorating vitreous, glass-ceramic, and ceramic articles utilizing offset printing techniques. For example, the inventive inks have the ability to wet various elastomer surfaces, especially silicone, at relatively high melt viscosities, viz., about 50–1000 poises, with sufficient plastic flow characteristics such that the extent of ink flow during printing and firing, even on vertical surfaces, is minimal. This phenomenon imparts the capability of exactly duplicating a design from an intaglio plate, a flexographic stamp, or a screen. The inventive inks demonstrate the ability to transfer from offset surfaces over a wide range of temperatures, although it is frequently necessary to have the temperature of the offset surface at least 10° C. below the softening point of the ink. Thus, the inks have manifested excellent resolution, color uniformity, and viscosity stability when printing from a heated intaglio surface, e.g., about 180°–300° F. (82°–149° C.), to an offset surface and then to a glass, glass-ceramic, or ceramic article. Where desired, inks can be compounded such that pressure sensitivity will not be demonstrated below a certain temperature. This feature is extremely useful in the storage of decals. Inks so formulated will be heated slightly, i.e., to about 100°–150° F. (37°–66° C.), before being transferred to ware, or must be transferred to a heated ware surface.

Inks operable in the present invention are prepared from a formulation consisting essentially of:

(a) about 50–80% by weight of a vitrifiable, inorganic flux containing up to about 30% by weight inorganic pigments and opacifiers;

(b) about 2–20% by weight of an ethylene-ester copolymer resin having about 8–40% by weight of a copolymerized ester selected from the group consisting of vinyl alcohol esters of $C_1$–$C_4$ saturated monocarboxylic acids and $C_1$–$C_5$ saturated alcohol esters of acrylic or methacrylic acid, the molecular weight of the polymer being such as to yield a melt index, as defined by ASTM D1238, of about 20–400 g/10 minutes;

(c) about 4–20% by weight of an amorphous tackifying resin having a Ring and Ball (R & B) softening point of about 104°–230° F. (40°–110° C.);

(d) about 5–25% by weight of an organic wax and/or plasticizer having an R & B softening point of less than about 212° F. (100° C.); and, frequently, (e) up to about 10% by weight of a modifying polyolefin resin selected from the group consisting of a polyethylene resin with a melt index, as defined by ASTM D1238, greater than about 20 g/10 minutes and an amorphous polypropylene resin having a melt viscosity of about 500–15,000 cps at 375° F. (~191° C.).

When properly formulated, the ink will demonstrate a R & B softening point between about 122°–203° F. (50°–95° C.) with a viscosity at 212° F. (100° C.) of about 100–1000 poises, as determined with a 100 rpm Brookfield thermocel. The vitrifiable fluxes with the inorganic pigments and opacifiers useful in the inventive products are materials of commerce and will be purchased from ceramic color manufacturers. Ideally, those materials will have an average particle size less than about 20 microns. The most preferred ethylene-ester copolymer resins are ethylene-vinyl acetate and ethylene-ethylacrylate. The amorphous resinous tackifier will most suitably consist of wood rosin or one of its ester derivatives, such as the glycerol and pentaerythritol esters, although other classes of tackifying resins, such as polyterpenes and aliphatic hydrocarbons are also operable. Waxes and plasticizers useful in the inventive products are numerous, the four principal criteria therefor being compatibility with the resin system employed, a melting point below 212° F. (100° C.), low volatility in the temperature range of 212°–302° F. (100°–150° C.), and satisfactory burnout characteristics. Useful waxes include such materials as paraffin and microcrystalline waxes, animal and vegetable waxes, fatty acids and alcohols, fatty acid esters, glycerides, hydrogenated oils, oxazoline wax, and such synthetic hydrocarbon waxes as the low molecular weight polyethylene waxes. Plasticizers found useful in the inventive products include mineral oil, hydrogenated vegetable oils, and the common families of ester plasticizers such as the dicarboxylic acid esters and the polyol esters.

In general, when pressure sensitivity at 100° F. (~37° C.) or below is desired, a plasticizer will be utilized, mineral oil and dioctyl phthalate being very satisfactory for this purpose. However, when pressure sensitivity is sought solely at high temperatures, a wax will commonly be employed, paraffin wax having a melting point of 130° F. (~54° C.) and stearyl alcohol having a melting point of 136° F. (~58° C.) being very suitable.

The optionally-present, modifying olefinic resin can consist of either a relatively low molecular weight polyethylene resin for reducing pressure sensitivity or an amorphous (atactic) polypropylene resin for increasing pressure sensitivity. Other modifying components typically used in the commercial adhesives, ink, and glass decorating industries, such as dispersants, anti-oxidants, and defoamers can likewise be utilized in the inventive materials up to about 5% total without adversely affecting the character of the inventive products.

RELATED APPLICATION

Heretofore decals have primarily been produced via screening or lithography techniques, although the feasibility of manufacture utilizing rotogravure and letterpress was known. The use of offset rotary lithographic presses for printing the varnishes in fabricating lithographic decalcomania has also been disclosed (U.S. Pat. No. 2,640,458). However, in each of the above-mentioned processes the inks and coatings employed contained various organic solvents and/or oils which were necessarily included in the printing media to impart printable viscosities thereto. U.S. application Ser. No. 074,910, pending filed concurrently herewith in the names of K. P. Heimbach and the present applicant, describes the first process for using thermoplastic (hot melt) inks and, specifically, the thermoplastic inks of the instant invention in the construction of vitreous and ceramic decalcomania.

DESCRIPTION OF THE PREFERRED EMBODIMENTS

The following table records several formulations in parts by weight of inks illustrating the desired properties. The pigmented glass flux materials were premilled with a dispersant in an alcoholic solvent to an average particle size of less than about 20 microns. The recited organic components were heated to a molten state and the flux materials blended therein, the mixing being continued until the alcoholic solvent was volatilized away and a homogeneous mixture obtained. The R & B softening point of each composition is tabulated as is the presence of pressure sensitivity below 100° F. In the characterization of this pressure sensitivity, M signifies moderate and S indicates slight.

TABLE

| | 1 | 2 | 3 | 4 | 5 | 6 |
|---|---|---|---|---|---|---|
| Pigmented Glass Flux | 300 | 300 | 300 | 300 | 300 | 270 |
| Ethylene-18% Vinyl Acetate. (Melt Index 150) | 25 | 25 | 25 | 40 | 25 | 25 |
| Amorphous Polypropylene (1000 cps at 375° F.) | 15 | 15 | 15 | — | 15 | 15 |
| *Escorez 1304 Hydrocarbon Resin (R&B Soft. Pt. 100° C.) | — | — | — | — | — | 40 |
| Glycerol Ester of Hydrogenated Resin (R&B Soft. Pt. 52° C.) | 40 | 40 | 40 | 40 | 40 | — |
| Mineral Oil (65 cps at 100° F.) | 40 | — | — | 40 | 20 | 40 |
| Dioctyl Phthalate | — | 40 | — | — | — | — |
| Paraffin Wax (Melting Pt. 130° F.) | — | — | 40 | — | — | — |
| Stearyl Alcohol | — | — | — | — | 20 | — |
| R&B Softening Point (°C.) | 73 | 77 | 72 | 73 | 74 | 74 |
| Pressure Sensitivity (Below 100° F.) | M | S | None | M | S | M |

*Marketed by Exxon Corporation

Formulations 1, 4, and 6 are equally applicable both for direct printing and in the manufacture of pressure release decals. Example 3, devoid of a plasticizer, is suitable for the production of heat release decals when printed over a polyethylene glycol wax release layer with a melting point between about 100°–120° F.

($\sim$37°–49° C.). Examples 2 and 5 are primarily applicable in direct printing processes.

As used in the present context, direct printing refers to those processes which apply a decoration onto ware, in contrast to indirect printing which designates those processes which print onto an intermediate substrate, e.g., decal paper, and then transfer the decoration to ware in a later second operation. Such usage is not universal. For example, the term indirect printing has sometimes been used to refer to all types of offset processes, whereas direct printing has been limited to those techniques in which the printing face contacts the surface of the ware, such as occurs in conventional screening, flexographic printing, etc.

The inks of this invention are operable in those direct printing processes which utilize an offset elastomeric surface, customarily a silicone rubber, to pick up molten ink from a heated, etched surface or screen and which then transfer the ink to a second surface by bringing the elastomeric surface into contact therewith. The inks cool upon the elastomeric surface to a temperature below their R & B softening points, but retain sufficient tack (pressure sensitivity) to permit transfer from the offset surface to a second surface for which the inks have greater affinity. The second surface is typically an article of glass, glass-ceramic, or ceramic ware, although it can also be heat release decal paper or a second elastomer, termed a collector, upon which a multi-colored print is developed via successive transfers from several offset elastomers. The completed multi-colored image on the collector elastomer can be transferred to an article of glass, glass-ceramic, or ceramic ware (or to some other surface) by bringing the collector into contact therewith. The collector elastomer can be a roll, a pad, a thin sheet, or silicone-coated release paper. In this latter instance, the multi-colored print constitutes a pressure release decal.

The following example illustrates one embodiment of a direct printing process utilizing inks of the present invention.

EXAMPLE

An intaglio printing plate is heated to about 180°–300° F. ($\sim$82°–149° C.) and flooded with an inventive ink in the molten state. Excess ink is removed therefrom with a squeegee or utilizing a doctor blade technique, leaving ink solely in the recessed design of the plate. The plate is thereafter brought into contact with an unheated silicone offset surface, in this case Dow Corning 3110 silicone, which is capable of being wetted by the molten ink. The offset surface is thereafter removed from the plate causing the liquid ink in the recessed design to be split between the two surfaces, thereby creating a mirror image of the design on the offset surface. The ink immediately cools to form a tacky film on the offset surface. The offset surface is then moved into contact with the surface to be decorated, e.g., an article of glass, glass-ceramic, or ceramic ware, and the ink coating transfers as an integral film from the offset surface to the ware surface upon separation.

The ink print upon the surface of the ware possesses sufficient integrity such that a second color can be immediately applied thereover and/or in contiguous relation thereto. Where desired, this transfer process can be repeated numerous times to apply a full spectrum of colors. Nevertheless, experience has demonstrated that, for optimum results, no more than four layers will be deposited in superjacent relation.

Where a decalcomania is to be printed rather than the surface of ware, the preferred practice involves utilizing flexographic printing or offset rotogravure as the printing process. Again, the intaglio or inking rolls are heated to about 180°–300° F. ($\sim$82°–149° C.) and the offset or flexographic rolls are preferably fabricated from a silicone rubber. When either heat or pressure release decals are to be prepared, it is most desirable to print a uniform, pin hole-free layer of ink upon the paper prior to applying the design colors. This ink layer has the same composition as that of the design layers, except that the inorganic filler is exclusively glass flux, i.e., there are no added colorants therein. This clear layer serves the dual function as a sealant to separate the design colors from the release layer and as an overflux for the fired decalcomania to enhance decoration durability. Because of the intrinsic adhesive nature of the inventive pressure-sensitive, thermoplastic inks, an adhesive overlayer, customarily employed in the preparation of both heat and pressure release decals, is not required for decals fabricated from these materials.

I claim:

1. A thermoplastic ink suitable for decorating glass, glass-ceramic, and ceramic articles exhibiting pressure sensitivity at temperatures substantially below its Ring and Ball softening point prepared from a formulation consisting essentially, in weight percent, of:
   (a) about 50–80% of a vitrifiable, inorganic flux containing up to about 30% by weight inorganic pigments and opacifiers;
   (b) about 2–20% of an ethylene-ester copolymer resin having about 8–40% by weight of a copolymerized ester selected from the group consisting of vinyl alcohol esters of $C_1$–$C_4$ saturated monocarboxylic acids and $C_1$–$C_5$ saturated alcohol esters of acrylic or methacrylic acid, the molecular weight of the polymer being such as to yield a melt index, as defined by ASTM D1238, of about 20–400 g/10 minutes;
   (c) about 4–20% of an amorphous tackifying resin having a Ring and Ball softening point of about 40°–110° C.;
   (d) 0–10% of a modifying polyolefin resin selected from the group consisting of a low molecular weight polyethylene resin with a melt index, as defined by ASTM D1238, greater than about 20 g/10 minutes and an amorphous polypropylene resin having a melt viscosity of about 500–15,000 cps at 375° F. ($\sim$191° C.); and
   (e) about 5–25% of an organic wax and/or plasticizer compatible with the resins of paragraphs (b), (c), and (d) and having a Ring and Ball softening point of less than about 100° C.

2. A thermoplastic ink according to claim 1 wherein said vitrifiable, inorganic flux containing up to 30% by weight inorganic pigments and opacifiers is present in particulate form, the particles having diameters less than about 20 microns.

3. A thermoplastic ink according to claim 1 wherein said ethylene-ester copolymer resin is selected from the group of ethylene-vinyl acetate and ethylene-ethylacrylate.

4. A thermoplastic ink according to claim 1 wherein said amorphous tackifying resin is selected from the group of wood rosin, the ester derivatives thereof, polyterpene resins, and aliphatic hydrocarbon resins.

5. A thermoplastic ink according to claim 4 wherein said ester derivative of wood rosin is selected from the group of the glycerol ester and the pentaerythritol ester.

6. A thermoplastic ink according to claim 1 wherein said organic wax is selected from the group of paraffin and microcrystalline mineral waxes, animal waxes, vegetable waxes, fatty alcohols, fatty acids, fatty acid esters, glycerides, oxazoline waxes, and hydrogenated vegetable oils.

7. A thermoplastic ink according to claim 6 wherein said fatty alcohol is stearyl alcohol.

8. A thermoplastic ink according to claim 1 wherein said plasticizer is selected from the group of mineral oil, hydrogenated vegetable oils, dicarboxylic acid esters, and polyol esters.

9. A thermoplastic ink according to claim 8 wherein said dicarboxylic acid ester is dioctyl phthalate.

10. A thermoplastic ink according to claim 1 wherein said softening point of said ink is below about 95° C. but above about 50° C.

11. A thermoplastic ink according to claim 1 wherein said ink exhibits pressure sensitivity below the softening point thereof but above about 37° C.

12. A thermoplastic ink according to claim 11 wherein said ink does not exhibit pressure sensitivity below about 37° C.

* * * * *